United States Patent [19]

Takahashi et al.

[11] 4,437,733
[45] Mar. 20, 1984

[54] ZOOM LENS

[75] Inventors: Tomowaki Takahashi, Kawasaki; Kunio Konno, Tokyo; Toshihiro Sasaya, Kawasaki, all of Japan

[73] Assignee: Nippon Kogaku K.K., Tokyo, Japan

[21] Appl. No.: 280,102

[22] Filed: Jul. 2, 1981

[30] Foreign Application Priority Data

Jul. 11, 1980 [JP] Japan .................................. 55-93804

[51] Int. Cl.³ .............................................. G02B 15/16
[52] U.S. Cl. .................................................... 350/427
[58] Field of Search ................................. 350/423, 427

[56] References Cited

U.S. PATENT DOCUMENTS 4,157,211 6/1979 Tanaka et al. .................. 350/427 X
4,318,592 3/1982 Tanaka ............................... 350/427

Primary Examiner—John K. Corbin
Assistant Examiner—Scott J. Sugarman
Attorney, Agent, or Firm—Shapiro and Shapiro

[57] ABSTRACT

A zoom lens comprises a magnification changing system and a relay lens system succeeding the magnification changing system. The magnification changing system comprises, in succession from the object side, a first group as a focusing portion having a positive refractive power, a second group as a variator portion having a negative refractive power and movable along the optical axis to thereby change chiefly the focal length, and a third group as a compensator portion having a negative refractive power and maintaining the image plane fluctuated by movement of the variator portion at a predetermined position. The relay lens system comprises a fourth group as a forward relay system group having a positive refractive power and a fifth group as a rearward relay system group having a positive refractive power. The fourth group has three positive lens components of which at least the middle lens component is a cemented lens component having a convex cemented surface in the direction of the image side. The fifth group has at least one positive lens component which is a cemented lens having a convex cemented surface on the object side.

10 Claims, 16 Drawing Figures

ZOOM LENS

BACKGROUND OF THE INVENTION

1. Field of the Invention

This invention relates to a zoom lens, and particularly to a zoom lens which comprises a magnification changing system including three groups or portions, i.e., a focusing portion having a positive refractive power, a variator portion having a negative refractive power, and a compensator portion having a negative refractive power, and a relay lens system.

2. Description of the Prior Art

Recently, by virtue of the progress of image pickup tubes, video cameras have been obtained which are sufficiently good in resolution, color balance and various image pickup characteristics for conventional 1-inch tubes and 2-inch tubes and even for ⅔-inch tubes. For use with such tubes, a need has arisen for compact and light-weight zoom lenses having a large aperture and a high zoom ratio. Regrettably, however, the zoom lenses commercially available have not been sufficiently compact and light in weight and have not had a sufficiently large aperture, and zoom lenses having higher performance have become necessary.

Generally, in the designing of zoom lenses, it is desired to reduce the total length of the lens and minimize the number of lenses in order to achieve compactness and light weight, but various difficulties have been encountered in realizing these aims.

First, in order to reduce the total length of the lens, it is indispensable to make the magnification changing system small, but if an attempt is made to make the magnification changing system small by intensifying the refractive power of the variator which, among the groups forming the magnification changing system, is regarded as the most effective to make the magnification changing system small, a sharp curvature would be provided to each surface of the lenses forming the variator and this would result in an increased amount of aberrations. Under such conditions, it has been very difficult to provide adequate correction of spherical aberration, coma and astigmatism over the entire magnification change range.

Also, in the relay lens system, when used as the optical system for a video camera or the like, it is necessary to place the exit pupil of the lens system substantially at an infinity position, that is, to make the system into a telecentric optical system and thus, the power arrangement of the relay lens system is limited and, necessarily, the compactness of the zoom lens is limited.

It has also been very difficult to realize a large aperture by using a limited number of lenses.

SUMMARY OF THE INVENTION

It is an object of the present invention to provide a zoom lens which is compact and light in weight and which has a large aperture ratio and a high zoom ratio.

The invention will become fully apparent from the following detailed description thereof taken in conjunction with the accompanying drawings.

BRIEF DESCRIPTION OF THE DRAWINGS

FIGS. 5A, 5B, 5C to 8A, 8B, 8C illustrate the various aberrations in the first to fourth embodiments.

DESCRIPTION OF THE PREFERRED EMBODIMENTS

Figure 1:
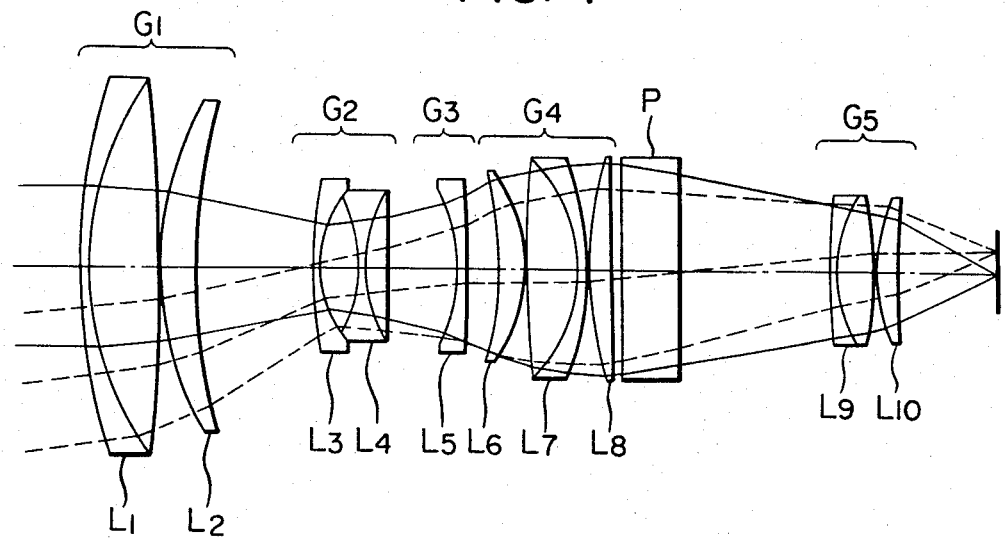
FIGS. 1 to 4 show the lens arrangements of first to fourth embodiments of the present invention at the intermediate focal length.

The zoom lens according to the present invention comprises a magnification changing system comprising, in succession from the object side, a first lens means or group as a focusing portion having a positive refractive power and having a focal length $f_1$, a second lens means or group as a variator portion having a negative refractive power and movable along the optical axis to thereby change chiefly the focal length and having a focal length $f_2$, and a third lens means or group as a compensator portion having a negative refractive power and maintaining the image plane thereof fluctuated by movement of the variator portion at a predetermined position and having a focal length $f_3$; and a relay lens system succeeding the magnification changing system; the relay lens system comprising a fourth lens means or group of focal length $f_4$ as a forward relay system group having a positive refractive power, and a fifth lens means or group of focal length $f_5$ as a rearward relay system group having a positive refractive power, the fourth lens means or group comprising three convex lens components of which at least the middle convex lens component is a cemented lens having a convex cemented surface on the image side, the fifth lens means or group comprising one or two convex lens components of which at least one convex lens component is a cemented lens having a convex cemented surface on the object side, the zoom lens satisfying the following conditions:

$$1.7 < \left| \frac{R_A}{F_W} \right| < 2.4 \quad (1)$$

$$0.5 < \frac{R_B}{F_W} < 2.0 \quad (2)$$

$$60 > \nu_{AP} - \nu_{AN} > 30 \quad (3)$$

$$60 > \nu_{BP} - \nu_{BN} > 20 \quad (4)$$

$$0.7 < \frac{D}{f_5} < 1.5 \quad (5)$$

$$1.0 < \frac{R_C}{Bf} < 5.0 \quad (6)$$

where $R_A$ represents the radius of curvature of the cemented surface of the middle cemented lens component in the fourth group, $\nu_{AP}$ and $\nu_{AN}$ represent the Abbe numbers of a positive lens and a negative lens, respectively, forming the middle cemented lens component in the fourth group, $R_B$ represents the radius of curvature of the cemented surface of the cemented lens component in the fifth group, $\nu_{BP}$ and $\nu_{BN}$ represent the Abbe numbers of a positive lens and a negative lens, respectively, forming the cemented lens component in the fifth group, $F_W$ represents the focal length of the entire system at the wide angle end, $f_5$ represents the focal length of the fifth group, D represents the spacing between the principal planes of the fourth group and the fifth group, $R_C$ represents the radius of curvature of the object side surface of the positive lens component in the fifth group, and $Bf$ represents the back focal length.

The foregoing conditions of the present invention will hereinafter be described. Since the zoom lens of the present invention aims at compactness, the refractive power of each group is made strong and therefore, occurrence of high order aberration components of various aberrations such as spherical aberration, coma and chromatic aberration is significant and it is essential to effect good correction over the entire magnification change range. In the present invention, therefore, the middle one of the three positive lens components forming the fourth group is provided by a cemented lens with the radius of curvature of the cemented surface thereof determined by condition (1), and a cemented surface is also provided in the fifth group and the radius of curvature of this cemented surface is determined as shown in condition (2). If these cemented surfaces have large radii of curvature exceeding the upper limits of conditions (1) and (2), respectively, correction of chromatic aberration will become difficult and it will be impossible to maintain a good imaging performance over the entire magnification change range. Furthermore, if the curvatures of the respective cemented surfaces are beyond the lower limits of conditions (1) and (2), occurrence of high order components such as spherical aberration, coma and chromatic aberration will become significant and it will be difficult to correct these adequately by a simple construction in which the fourth group comprises three components and the fifth group comprises a maximum of two components. Particularly, if the radius of curvature of the cemented surface in the fifth group is too small, the asymmetry of coma for short wavelength side light represented by the g-line ($\lambda=435.8$ mm) will become significant. Also, if the radius of curvature of each cemented surface is small, the lens will necessarily become thick and weighty and this will be disadvantageous in making the lens light in weight; particularly, if the fourth group is made thick, the principal point of this group will shift toward the image side and will be liable to mechanically interfere with the third group which is a movable group, and this will also be disadvantageous in increasing the zoom ratio. Conditions (3) and (4) are necessary to sustain the above-described conditions (1) and (2).

Condition (5) is for placing the exit pupil position substantially at an infinite distance to make the system into a telecentric optical system. If the lower limit of this condition is exceeded, the exit pupil position will be too near the image side from the object side, and conversely, if the upper limit of this condition is exceeded, the exit pupil position will come too near the image plane from infinity on the image side, and this will deviate from the purpose of making the system into a telecentric optical system.

The reason why the system is made into a telecentric optical system is peculiar to video cameras, and it is a condition which is not required of common cinecameras, still cameras or the like. This is because, with a single-tube type color image pickup tube or CCD image pickup plate, it is usually necessary to separate three colors, blue, green and red and take out electrical signals, and as a method therefor, a stripe filter is used on the image plane. The reason is that if the light beam incident on the stripe filter is not approximate to perpendicular incidence, there may result color registration. Also, in the case of a three-tube type for ENG or the like, use is made of a three-color resolving prism and again in this case, the light beam must be approximate to perpendicular incidence for the purpose of uniformity of the spectral characteristics of the prism, and the system must also be a telecentric optical system. That is, in either the case of a single-tube type or the case of a multi-tube type, the system must be a telecentric optical system.

However, even if only the principal ray is telecentric, when there is a great difference in rate of the quantity of light between the upper half light beam above the principal ray and the lower half light beam below the principal ray, there may also result color registration and this is not desirable. When there is a great difference between the two, the telecentricity of the principal ray must sometimes be corrected by being deviated within a warrantable range and such correction becomes possible within the range of condition (5).

Condition (6) is for preventing occurrence of ghost. Usually, if design is made without paying attention to occurrence of ghost, the reflected light from the film surface or the surfaces of various image pickup tubes is reflected by the object side surface of each lens component of the rearward relay lens group and again reaches the image side to degrade the image quality significantly, but this can be prevented by setting up this condition. If the lower limit of this condition is exceeded, the curvature of the surface will be great and reflected light will concentrate upon the image plane to cause occurrence of ghost. If the upper limit of this condition is exceeded, it will be advantageous for the prevention of ghost but it will become difficult to correct residual spherical aberration and coma.

This situation is also applicable to the second or, in some cases, the third convex lens component of the rearward group lens components from the image side, and further to the convex lens component of the forward group components.

Specifically, in the present invention as described above, it is desirable that the first group comprise a positive lens component having its convex surface facing the object side and having a cemented surface, and a positive meniscus lens component having its convex surface facing the object side; the second group comprise a negative meniscus lens component having its convex surface facing the object side, and a negative lens component having its convex surface facing the object side and having a cemented surface; the third group comprise a negative lens component having its surface of sharper curvature facing the object side; the fourth group comprise a positive lens component having its surface of sharper curvature facing the image side, a biconvex positive lens component having its convex surface facing the image side and having a cemented surface, and a positive lens component having its surface of sharper curvature facing the object side; and the fifth group comprise one or two positive lens components, of which the object side component is constructed as a positive lens component having its convex surface facing the object side and having a cemented surface.

In such a specific construction, the zoom lens of the present invention should desirably further satisfy the following conditions:

$$0.5 < \frac{f_1}{F_T} < 1.5 \qquad (7)$$

$$-5.0 < \frac{f_1}{f_2} < -3.7 \qquad (8)$$

$$2.5 < \frac{f_3}{f_2} < 3.0 \qquad (9)$$

$$-3.0 < \frac{r_a + r_b}{r_a - r_b} < -1.5 \qquad (10)$$

where $F_T$ represents the focal length of the entire system at the telephoto end and $r_a$ and $r_b$ represent the radii of curvature of the forward and rearward surfaces, respectively, of the positive meniscus lens group in the first group.

Condition (7) determines the power distribution of the first group in the entire system and it is a condition advantageous for making the entire lens system compact. If the upper limit of this condition is exceeded, the lens system will become long contrary to the intended purpose, and, if the lower limit of this condition is exceeded, the lens system will be made compact but, at the same time, mechanical accuracy requirements will become severe and particularly, the accuracy requirements of the cam. If the accuracy requirements of the cam become too severe, manufacture at the actual manufacturing accuracy will become impossible and the image performance will deteriorate. Thus, the range of condition (7) is appropriate.

Condition (8) determines the relation of movement for zooming between the second group which is the variator portion and the third group which is the compensator portion. If the upper limit of this condition is exceeded, the amount of movement of the compensator portion will be increased and it will become difficult to make the magnification changing system small and, if the lower limit of this condition is exceeded, it will become possible to make the magnification changing system small but the form of movement of curve the compensator portion will become a sharp curve on the long focal length side and the structure of the lens barrel will unavoidably become complicated. As far as aberrations are concerned, if the lower limit of this condition is exceeded, the Petzval sum will be deteriorated and it will become difficult to correct astigmatism in a good balance with the other aberrations and further, it will also become difficult to provide adequate correction of spherical aberration and coma, including chromatic aberration, over the entire magnification change range. If the upper limit of this condition is exceeded, correction of each aberration will become easy but compactness of the system will become difficult to achieve, as mentioned above.

Condition (9) is for limiting the diameter of the forward lens by the influence of the oblique light beam at very short distance while making the size of the magnification changing system small and for confining the Petzval sum of the entire system to the positive direction. If the lower limit of this condition is exceeded, the Petzval sum will incline toward the negative direction and the power of the negative lens component in the third group will unadvisably become so strong that it will be a great burden to correct this by the lens component in any other group. If the upper limit of this condition is exceeded, the total length of the lens and the diameter of the forward lens will be increased.

Condition (10) is effective to keep spherical aberration acceptable on the long focal length side and to reduce the deviation of sine condition. If the lower limit of this condition is exceeded, the deviation of sine condition will be increased in the negative direction and, if the upper limit of this condition is exceeded, the deviation of sine condition will be increased in the positive direction, and this will not be appropriate.

Further, in the construction of the present invention, it is desirable that the focal lengths $f_1$, $f_2$, $f_3$, $f_4$ and $f_5$ of the respective groups be set to the following ranges with respect to the focal length $F_W$ of the entire system at the wide angle end:

$$5.0 F_W < f_1 < 8.0 F_W \qquad (11)$$

$$1.0 F_W < |f_2| < 2.0 F_W \qquad (12)$$

$$3.0 F_W < |f_3| < 5.0 F_W \qquad (13)$$

$$1.5 F_W < f_4 < 2.5 F_W \qquad (14)$$

$$2.5 F_W < f_5 < 5.5 F_W \qquad (15)$$

Embodiments of the present invention will hereinafter be described. A first embodiment shown in FIG. 1 is a bright 6-times zoom lens having a focal length 11.5–69 mm and F-number 1.2. A half-prism for directing the light path for the viewfinder is inserted between the fourth group and the fifth group of this embodiment.

Figure 2:
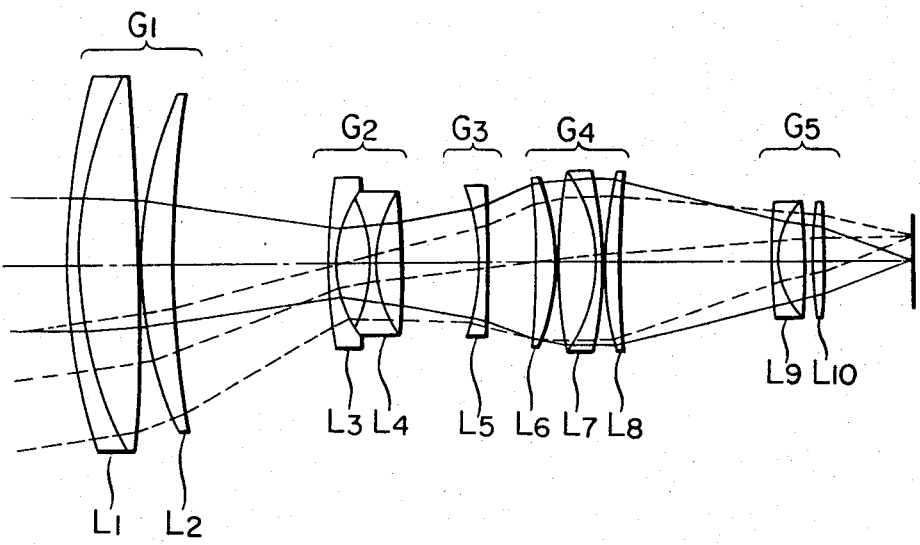
Figure 3:
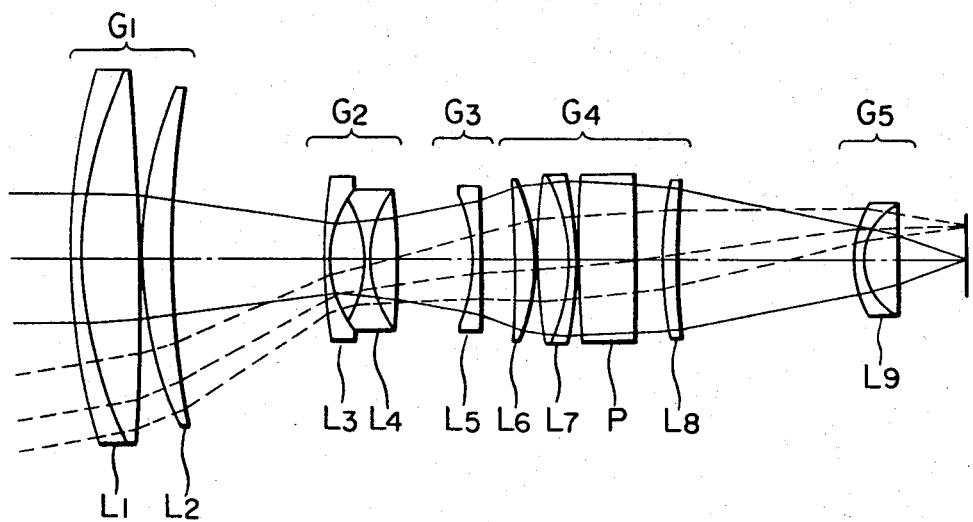

Along with the brightness of this lens which is as high as F-number 1.2, the total length thereof is as short as 162.7 m/m, and the effective diameter of the forward lens is minimized to 53.5 mm, and this lens has a practically sufficient performance up to the very short distance of 0.93 m. Moreover, this lens is of a construction in which the ghost image by reflection of the light from the image pickup surface is eliminated and color registration can hardly be present. Both of a second and a third embodiment shown in FIGS. 2 and 3, respectively, are examples having a zoom ratio 8, a focal length 11–88 mm and F-number 1.6. The latter is an example in which the magnification changing system of the former is used in common and a half-prism is inserted in the fourth group of the relay lens system and the fifth group is provided by a single cemented lens.

Figure 4:
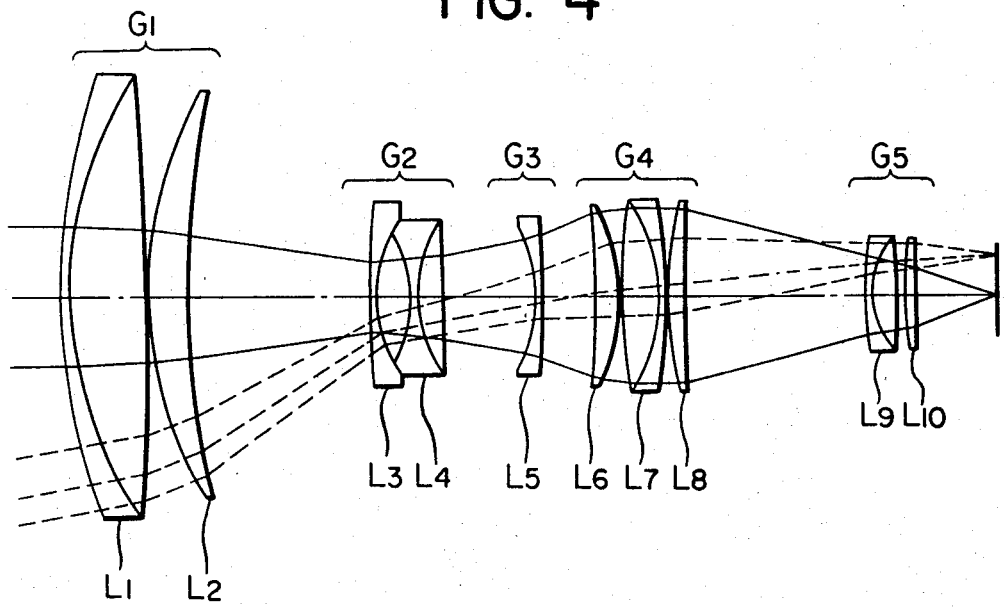
Figure 5A:
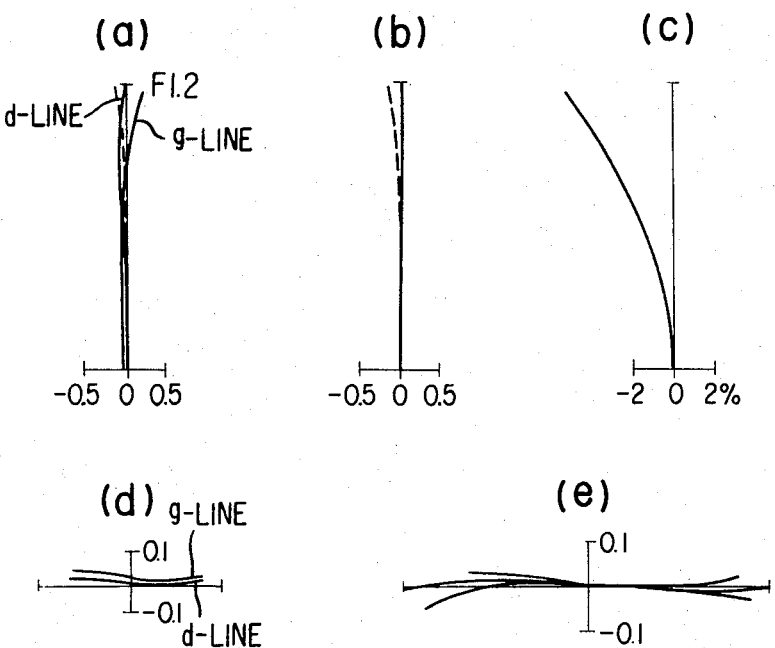
Figure 5B:
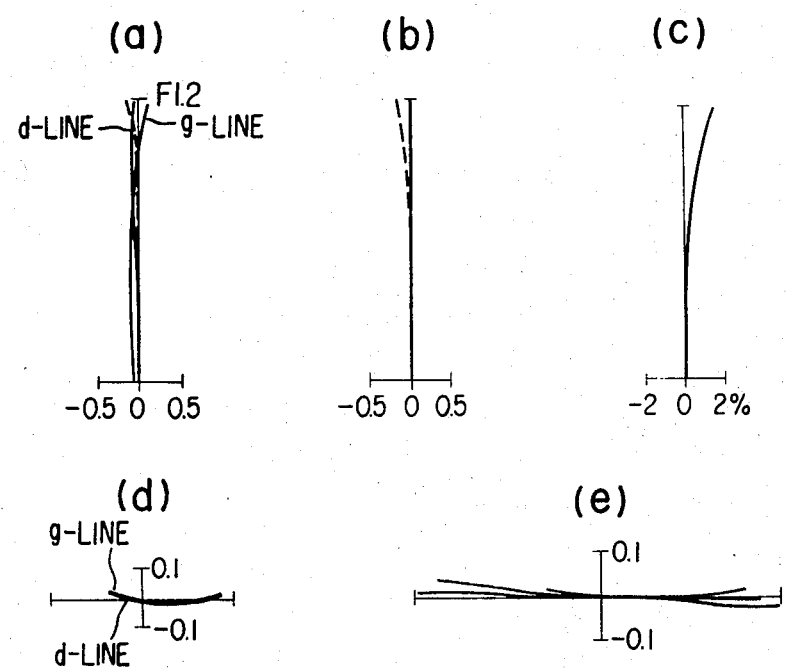
Figure 5C:
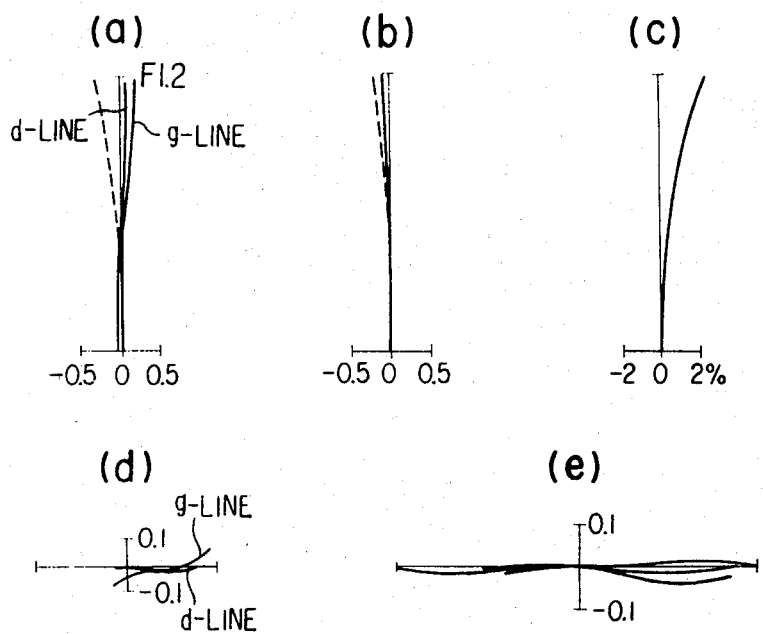
Figure 6A:
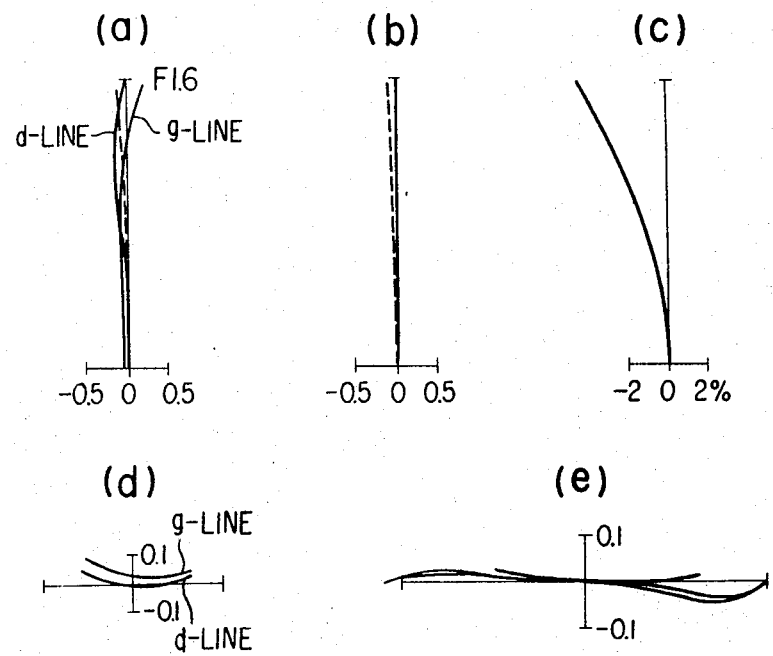
Figure 6B:
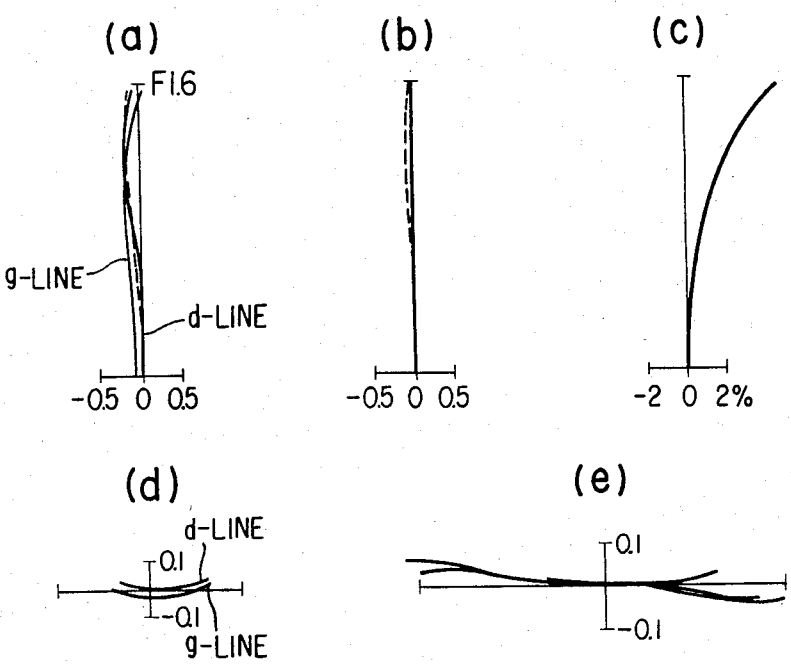
Figure 6C:
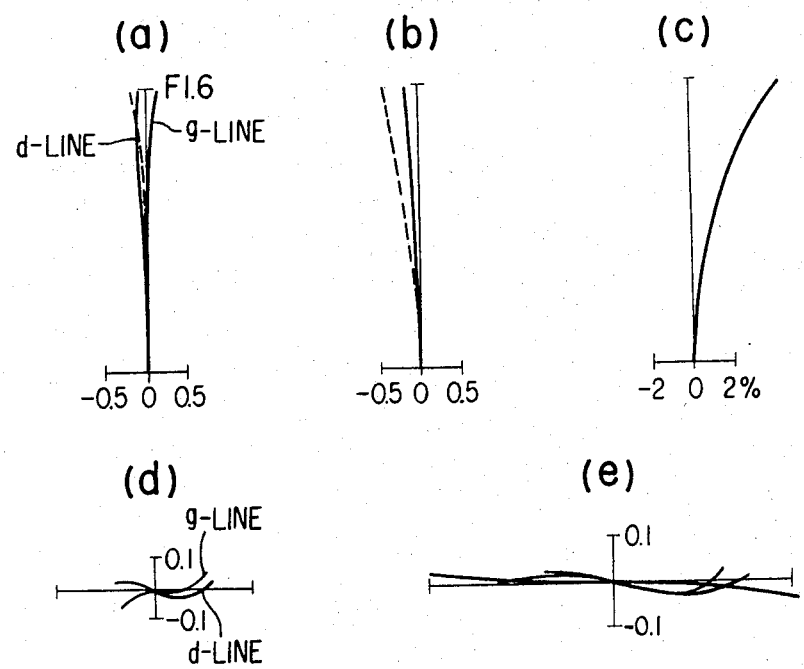
Figure 7A:
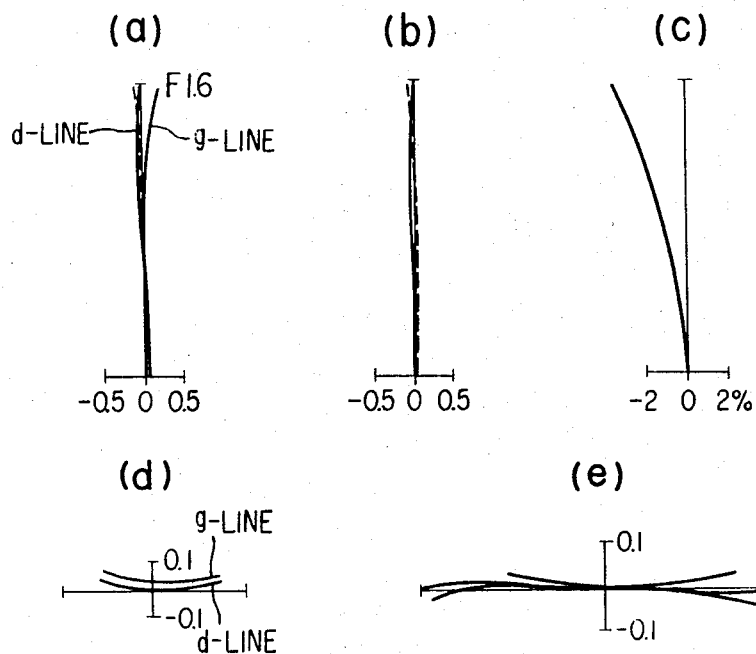
Figure 7B:
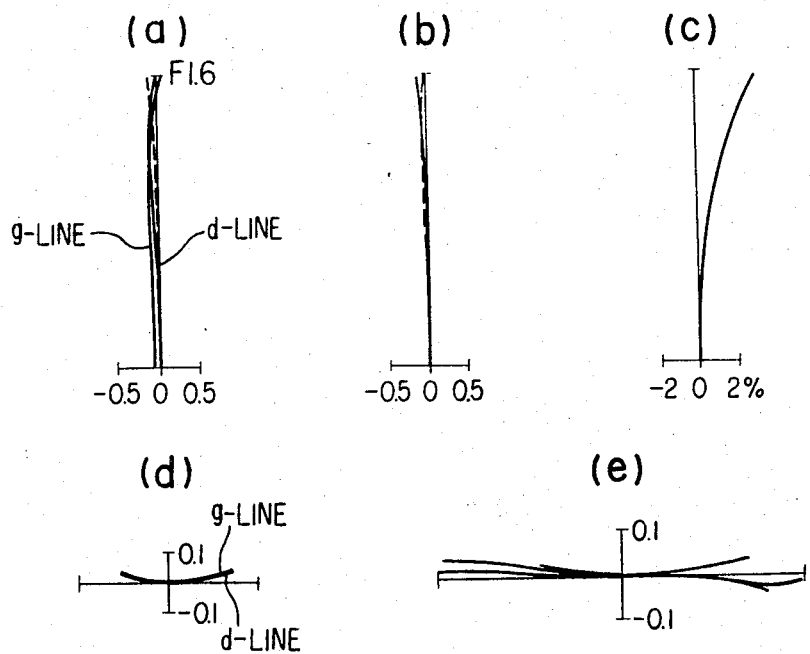
Figure 7C:
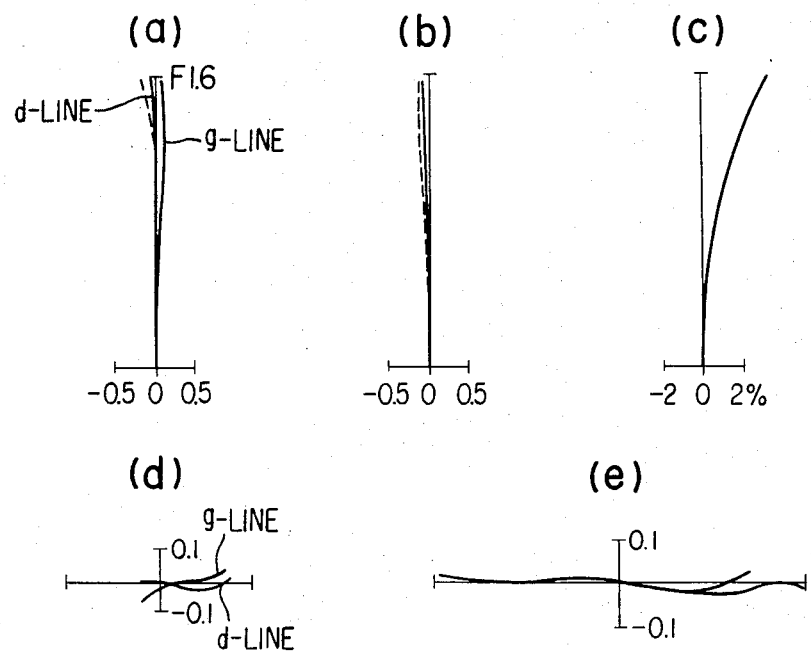
Figure 8A:
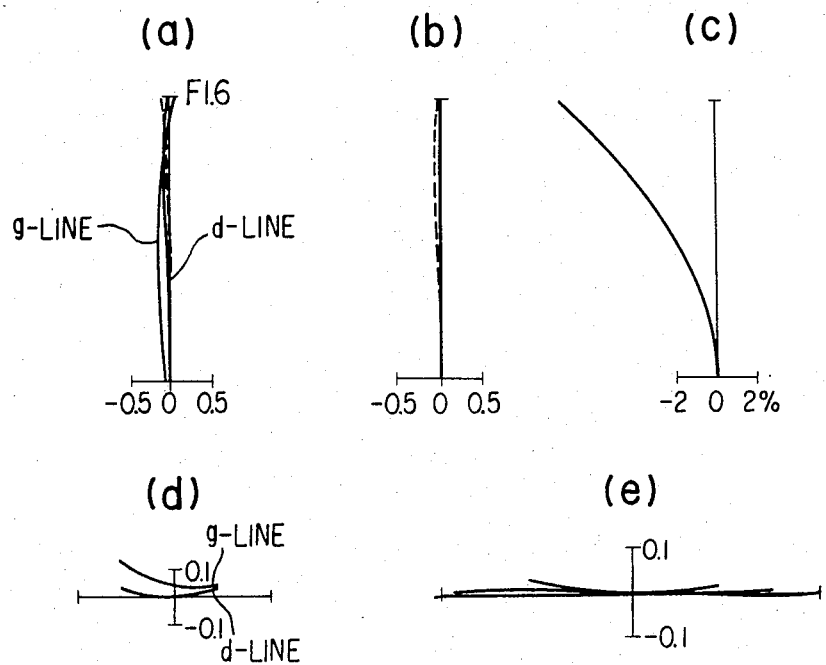
Figure 8B:
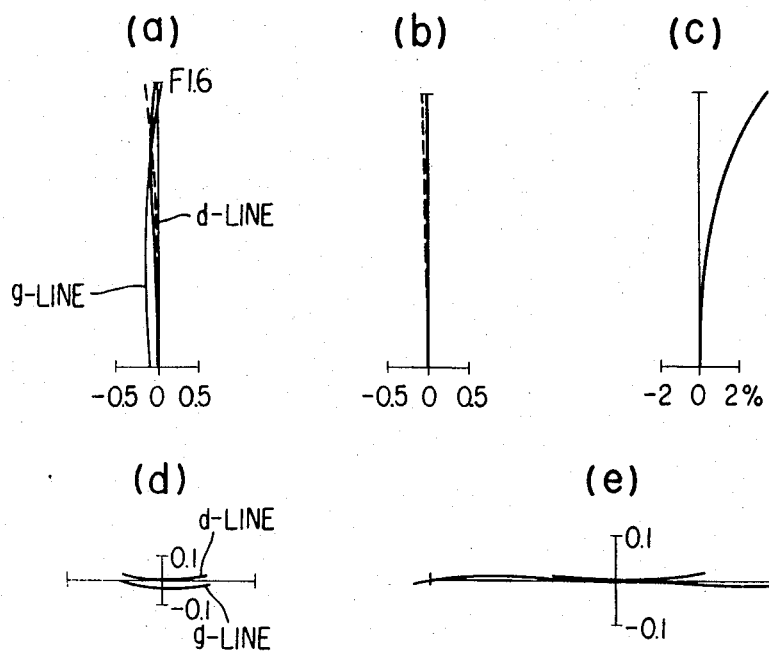
Figure 8C:
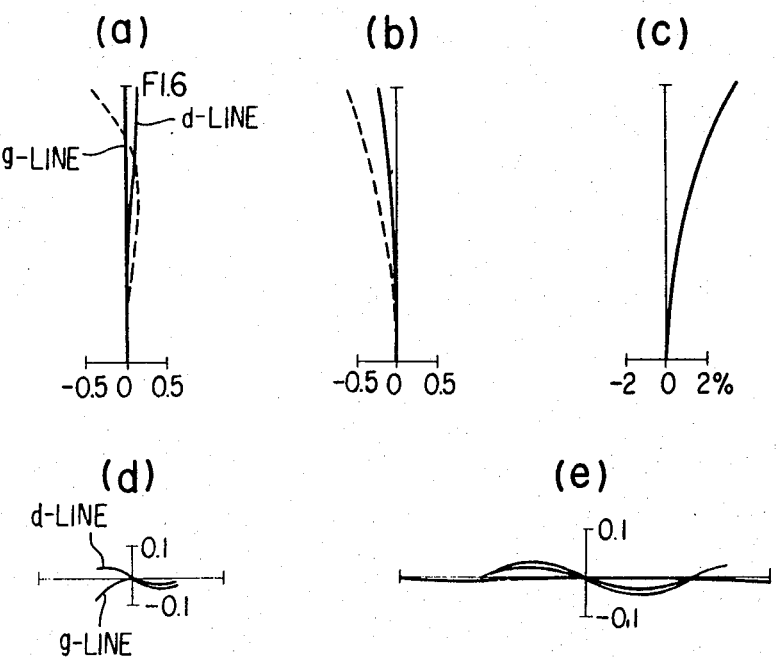

The zoom lenses of the second and third embodiments are compact for their high magnification and enable very short distance photography to be effected up to 1.05 m for the second embodiment and up to 0.74 m for the third embodiment. In these embodiments, the total length is 140 mm and the effective diameter of the forward lens is 53.5 mm. A fourth embodiment shown in FIG. 4 has a zoom ratio 10, a focal length 10.5–105 mm and F-number 1.6. In spite of its high magnification, this embodiment is relatively compact with the total length being 163.7 mm and the effective diameter of the forward lens being 63.7 mm, and very short distance photography is possible up to 1.29 m.

FIGS. 1 to 4 are lens arrangement views of the various embodiments in the intermediate focal length $F_M$ thereof and, in each of these Figures, the light rays from an infinite object point on the axis are indicated by solid lines and the oblique light rays of a maximum angle of view are indicated by dashed lines.

The numerical data of the first, second, third and fourth embodiments will be shown in the tables below. In the tables, $r_1$, $r_2$, $r_3$, . . . represent the radii of curvature of the refracting surfaces of the successive lenses from the object side, $d_1$, $d_2$, $d_3$, . . . represent the center thicknesses and air spaces of the respective lenses, $n_1$, $n_2$, $n_3$, . . . and $\nu_1$, $\nu_2$, $\nu_3$, . . . represent the refractive indices and Abbe numbers, respectively, of the respective lenses for the d-line, and Bf represents the back focal length.

$f_5 = 34.3$

First Embodiment
Focal length 11.5~69.0, Zoom ratio 6, F-number 1.2

| Radius of curvature | | Center thickness and air space | | Refractive index | | Abbe number | | | |
|---|---|---|---|---|---|---|---|---|---|
| $r_1$ | 82.283 | $d_1$ | 1.3 | $n_1$ | 1.80518 | $\nu_1$ | 25.5 | } $L_1$ | |
| $r_2$ | 41.208 | $d_2$ | 11.7 | $n_2$ | 1.71300 | $\nu_2$ | 53.9 | | } $G_1$ |
| $r_3$ | −395.394 | $d_3$ | 0.1 | | | | | | |
| $r_4$ | 42.755 | $d_4$ | 5.7 | $n_3$ | 1.51680 | $\nu_3$ | 64.2 | $L_2$ | |
| $r_5$ | 92.175 | $d_5$ | Variable | | | | | | |
| $r_6$ | 122.416 | $d_6$ | 1.0 | $n_4$ | 1.74443 | $\nu_4$ | 49.4 | $L_3$ | |
| $r_7$ | 15.859 | $d_7$ | 6.5 | | | | | | } $G_2$ |
| $r_8$ | −20.060 | $d_8$ | 1.0 | $n_5$ | 1.60311 | $\nu_5$ | 60.7 | } $L_4$ | |
| $r_9$ | 22.337 | $d_9$ | 3.5 | $n_6$ | 1.80518 | $\nu_6$ | 25.5 | | |
| $r_{10}$ | −6704.737 | $d_{10}$ | Variable | | | | | | |
| $r_{11}$ | −21.619 | $d_{11}$ | 1.0 | $n_7$ | 1.60311 | $\nu_7$ | 60.7 | $L_5$ | } $G_3$ |
| $r_{12}$ | −189.609 | $d_{12}$ | Variable | | | | | | |
| $r_{13}$ | −42.947 | $d_{13}$ | 3.9 | $n_8$ | 1.71300 | $\nu_8$ | 53.9 | $L_6$ | |
| $r_{14}$ | −22.593 | $d_{14}$ | 0.1 | | | | | | |
| $r_{15}$ | 158.920 | $d_{15}$ | 9.0 | $n_9$ | 1.56384 | $\nu_9$ | 60.8 | } $L_7$ | } $G_4$ |
| $r_{16}$ | −21.084 | $d_{16}$ | 1.0 | $n_{10}$ | 1.74000 | $\nu_{10}$ | 28.2 | | |
| $r_{17}$ | −46.347 | $d_{17}$ | 0.2 | | | | | | |
| $r_{18}$ | 44.489 | $d_{18}$ | 3.8 | $n_{11}$ | 1.74000 | $\nu_{11}$ | 44.9 | $L_8$ | |
| $r_{19}$ | 362.562 | $d_{19}$ | 1.8 | | | | | | |
| $r_{20}$ | ∞ | $d_{20}$ | 10.0 | $n_{12}$ | 1.57501 | $\nu_{12}$ | 41.3 | Prism P | |
| $r_{21}$ | ∞ | $d_{21}$ | 25.1 | | | | | | |
| $r_{22}$ | 144.303 | $d_{22}$ | 1.0 | $n_{13}$ | 1.74000 | $\nu_{13}$ | 28.2 | } $L_9$ | |
| $r_{23}$ | 17.591 | $d_{23}$ | 6.0 | $n_{14}$ | 1.56384 | $\nu_{14}$ | 60.8 | | } $G_5$ |
| $r_{24}$ | −52.016 | $d_{24}$ | 0.2 | | | | | | |
| $r_{25}$ | 19.770 | $d_{25}$ | 4.0 | $n_{15}$ | 1.51680 | $\nu_{15}$ | 64.2 | $L_{10}$ | |
| $r_{26}$ | 136.874 | Bf | 16.54 | | | | | | |

| Focal length | $F_W = 11.5$ | $F_M = 28.0$ | $F_T = 69.0$ |
|---|---|---|---|
| $d_5$ | 1.96 | 20.04 | 31.05 |
| $d_{10}$ | 32.71 | 12.06 | 4.00 |
| $d_{12}$ | 3.42 | 6.99 | 3.05 |

$f_1 = 63.3$ $f_2 = -15.0$ $f_3 = -40.5$ $f_4 = 24.8$

Principal plane spacing between the fourth group and the fifth group D = 42.36

$\begin{pmatrix} r_{16} \text{ corresponds to } R_A \\ r_{23} \text{ corresponds to } R_B \end{pmatrix}$

Second Embodiment
Focal length 11.0~88.0, Zoom ratio 8, F-number 1.6

| Radius of curvature | | Center thickness and air space | | Refractive index | | Abbe number | | | |
|---|---|---|---|---|---|---|---|---|---|
| $r_1$ | 87.625 | $d_1$ | 1.3 | $n_1$ | 1.80518 | $\nu_1$ | 25.5 | } $L_1$ | |
| $r_2$ | 47.000 | $d_2$ | 10.3 | $n_2$ | 1.65160 | $\nu_2$ | 58.5 | | } $G_1$ |
| $r_3$ | −401.700 | $d_3$ | 0.1 | | | | | | |
| $r_4$ | 49.638 | $d_4$ | 5.4 | $n_3$ | 1.51660 | $\nu_3$ | 64.2 | $L_2$ | |
| $r_5$ | 129.555 | $d_5$ | variable | | | | | | |
| $r_6$ | 89.890 | $d_6$ | 1.0 | $n_4$ | 1.71300 | $\nu_4$ | 53.9 | $L_3$ | |
| $r_7$ | 15.414 | $d_7$ | 5.8 | | | | | | } $G_2$ |
| $r_8$ | −20.393 | $d_8$ | 1.0 | $n_5$ | 1.58913 | $\nu_5$ | 61.2 | } $L_4$ | |
| $r_9$ | 18.054 | $d_9$ | 3.9 | $n_6$ | 1.71736 | $\nu_6$ | 29.5 | | |
| $r_{10}$ | −299.105 | $d_{10}$ | variable | | | | | | |
| $r_{11}$ | −23.883 | $d_{11}$ | 1.0 | $n_7$ | 1.60311 | $\nu_7$ | 60.7 | $L_5$ | } $G_3$ |
| $r_{12}$ | −237.505 | $d_{12}$ | variable | | | | | | |
| $r_{13}$ | −153.412 | $d_{13}$ | 3.2 | $n_8$ | 1.71300 | $\nu_8$ | 53.9 | $L_6$ | |
| $r_{14}$ | −29.058 | $d_{14}$ | 0.1 | | | | | | |
| $r_{15}$ | 56.397 | $d_{15}$ | 6.5 | $n_9$ | 1.58913 | $\nu_9$ | 61.2 | } $L_7$ | } $G_4$ |
| $r_{16}$ | −22.050 | $d_{16}$ | 1.0 | $n_{10}$ | 1.75520 | $\nu_{10}$ | 27.5 | | |
| $r_{17}$ | −68.139 | $d_{17}$ | 0.1 | | | | | | |
| $r_{18}$ | 37.710 | $d_{18}$ | 2.5 | $n_{11}$ | 1.71300 | $\nu_{11}$ | 53.9 | $L_8$ | |

-continued

Second Embodiment
Focal length 11.0~88.0, Zoom ratio 8, F-number 1.6

| | | | | | | | | | |
|---|---|---|---|---|---|---|---|---|---|
| $r_{19}$ | 114.270 | $d_{19}$ | 21.9 | | | | | | |
| $r_{20}$ | 83.072 | $d_{20}$ | 1.0 | $n_{12}$ | 1.74950 | $\nu_{12}$ | 25.0 | } $L_9$ | |
| $r_{21}$ | 11.546 | $d_{21}$ | 4.3 | $n_{13}$ | 1.56823 | $\nu_{13}$ | 56.0 | | } $G_5$ |
| $r_{22}$ | −98.731 | $d_{22}$ | 1.0 | | | | | | |
| $r_{23}$ | 50.000 | $d_{23}$ | 2.0 | $n_{14}$ | 1.74400 | $\nu_{14}$ | 44.9 | $L_{10}$ | |
| $r_{24}$ | −130.371 | Bf | 14.95 | | | | | | |

| Focal length | $F_W = 11.0$ | $F_M = 31.0$ | $F_T = 88.0$ |
|---|---|---|---|
| $d_5$ | 0.89 | 26.77 | 40.85 |
| $d_{10}$ | 41.97 | 13.27 | 3.26 |
| $d_{12}$ | 4.53 | 8.35 | 4.27 |

$f_1 = 72.1$ $f_2 = -16.4$ $f_3 = -44.3$ $f_4 = 22.2$ $f_5 = 49.7$

Principal plane spacing between the fourth group and the fifth group D=51.19

$\begin{pmatrix} r_{16} \text{ corresponds to } R_A \\ r_{21} \text{ corresponds to } R_B \end{pmatrix}$ $f_1 = 72.1$ $f_2 = -16.4$ $f_3 = -44.3$ $f_4 = 21.5$ $f_5 = 37.8$ Principal plane spacing between the fourth group and the fifth group D=34.02

$\begin{pmatrix} r_{16} \text{ corresponds to } R_A \\ r_{23} \text{ corresponds to } R_B \end{pmatrix}$

Third Embodiment
Focal length 11.0~88.0, Zoom ratio 8, F-number 1.6

| Radius of curvature | | Center thickness and air space | | Refractive index | | Abbe number | | | |
|---|---|---|---|---|---|---|---|---|---|
| $r_1$ | 87.620 | $d_1$ | 1.3 | $n_1$ | 1.80518 | $\nu_1$ | 25.5 | } $L_1$ | |
| $r_2$ | 47.000 | $d_2$ | 10.3 | $n_2$ | 1.65160 | $\nu_2$ | 58.5 | | } $G_1$ |
| $r_3$ | −401.700 | $d_3$ | 0.1 | | | | | | |
| $r_4$ | 49.640 | $d_4$ | 5.4 | $n_3$ | 1.5168 | $\nu_3$ | 64.2 | $L_2$ | |
| $r_5$ | 129.551 | $d_5$ | variable | | | | | | |
| $r_6$ | 89.890 | $d_6$ | 1.0 | $n_4$ | 1.71300 | $\nu_4$ | 53.9 | $L_3$ | |
| $r_7$ | 15.410 | $d_7$ | 5.8 | | | | | | } $G_2$ |
| $r_8$ | −20.400 | $d_8$ | 1.0 | $n_5$ | 1.58913 | $\nu_5$ | 61.2 | } $L_4$ | |
| $r_9$ | 18.050 | $d_9$ | 3.9 | $n_6$ | 1.71736 | $\nu_6$ | 29.5 | | |
| $r_{10}$ | −298.366 | $d_{10}$ | variable | | | | | | |
| $r_{11}$ | −23.880 | $d_{11}$ | 1.0 | $n_7$ | 1.60311 | $\nu_7$ | 60.7 | $L_5$ | } $G_3$ |
| $r_{12}$ | −227.227 | $d_{12}$ | variable | | | | | | |
| $r_{13}$ | −158.642 | $d_{13}$ | 3.2 | $n_8$ | 1.71300 | $\nu_8$ | 53.9 | $L_6$ | |
| $r_{14}$ | −29.277 | $d_{14}$ | 0.1 | | | | | | |
| $r_{15}$ | 61.016 | $d_{15}$ | 5.9 | $n_9$ | 1.58913 | $\nu_9$ | 61.2 | } $L_7$ | |
| $r_{16}$ | −22.400 | $d_{16}$ | 1.0 | $n_{10}$ | 1.80518 | $\nu_{10}$ | 25.5 | | $G_4$ |
| $r_{17}$ | −50.736 | $d_{17}$ | 0.3 | | | | | | |
| $r_{18}$ | ∞ | $d_{18}$ | 10.0 | $n_{11}$ | 1.57501 | $\nu_{11}$ | 41.3 | Prism P | |
| $r_{19}$ | ∞ | $d_{19}$ | 4.0 | | | | | | |
| $r_{20}$ | 40.658 | $d_{20}$ | 2.5 | $n_{12}$ | 1.74443 | $\nu_{12}$ | 49.4 | $L_8$ | |
| $r_{21}$ | 103.601 | $d_{21}$ | 29.7 | | | | | | |
| $r_{22}$ | 16.288 | $d_{22}$ | 1.0 | $n_{13}$ | 1.75520 | $\nu_{13}$ | 27.5 | } $L_9$ | } $G_5$ |
| $r_{23}$ | 8.967 | $d_{23}$ | 6.0 | $n_{14}$ | 1.56883 | $\nu_{14}$ | 56.0 | | |
| $r_{24}$ | −1564.799 | Bf | 11.43 | | | | | | |

| Focal length | $F_W = 11.0$ | $F_M = 31.0$ | $F_T = 88.0$ |
|---|---|---|---|
| $d_5$ | 0.89 | 25.76 | 39.85 |
| $d_{10}$ | 41.97 | 13.27 | 3.26 |
| $d_{12}$ | 2.11 | 5.93 | 1.86 |

Fourth Embodiment
Focal length 10.5~105.0, Zoom ratio 10, F-number 1.6

| Radius of curvature | | Center thickness and air space | | Refractive index | | Abbe number | | | |
|---|---|---|---|---|---|---|---|---|---|
| $r_1$ | 97.177 | $d_1$ | 1.3 | $n_1$ | 1.80518 | $v_1$ | 25.5 | } $L_1$ | |
| $r_2$ | 53.212 | $d_2$ | 12.5 | $n_2$ | 1.65160 | $v_2$ | 58.5 | | } $G_1$ |
| $r_3$ | −799.589 | $d_3$ | 0.1 | | | | | | |
| $r_4$ | 55.667 | $d_4$ | 7.0 | $n_3$ | 1.51860 | $v_3$ | 70.1 | $L_2$ | |
| $r_5$ | 172.998 | $d_5$ | variable | | | | | | |
| $r_6$ | 167.781 | $d_6$ | 1.0 | $n_4$ | 1.65160 | $v_4$ | 58.5 | $L_3$ | |
| $r_7$ | 16.132 | $d_7$ | 6.1 | | | | | | } $G_2$ |
| $r_8$ | −23.692 | $d_8$ | 1.0 | $n_5$ | 1.58913 | $v_5$ | 61.2 | } $L_4$ | |
| $r_9$ | 18.905 | $d_9$ | 4.0 | $n_6$ | 1.72825 | $v_6$ | 28.3 | | |
| $r_{10}$ | 330.951 | $d_{10}$ | variable | | | | | | |
| $r_{11}$ | −24.955 | $d_{11}$ | 1.0 | $n_7$ | 1.60311 | $v_7$ | 60.7 | $L_5$ | } $G_3$ |
| $r_{12}$ | −349.908 | $d_{12}$ | variable | | | | | | |
| $r_{13}$ | −211.000 | $d_{13}$ | 3.4 | $n_8$ | 1.74443 | $v_8$ | 49.4 | $L_6$ | |
| $r_{14}$ | −30.530 | $d_{14}$ | 0.1 | | | | | | |
| $r_{15}$ | 66.041 | $d_{15}$ | 6.8 | $n_9$ | 1.58913 | $v_9$ | 61.2 | } $L_7$ | } $G_4$ |
| $r_{16}$ | −24.732 | $d_{16}$ | 1.1 | $n_{10}$ | 1.78470 | $v_{10}$ | 26.1 | | |
| $r_{17}$ | −83.595 | $d_{17}$ | 0.1 | | | | | | |
| $r_{18}$ | 40.841 | $d_{18}$ | 2.6 | $n_{11}$ | 1.71300 | $v_{11}$ | 53.9 | $L_8$ | |
| $r_{19}$ | 167.230 | $d_{19}$ | 30.0 | | | | | | |
| $r_{20}$ | 48.248 | $d_{20}$ | 1.0 | $n_{12}$ | 1.74950 | $v_{12}$ | 35.0 | } $L_9$ | |
| $r_{21}$ | 10.845 | $d_{21}$ | 5.0 | $n_{13}$ | 1.56883 | $v_{13}$ | 56.0 | | } $G_5$ |
| $r_{22}$ | −115.462 | $d_{22}$ | 1.0 | | | | | | |
| $r_{23}$ | 60.000 | $d_{23}$ | 2.1 | $n_{14}$ | 1.79631 | $v_{14}$ | 40.8 | $L_{10}$ | |
| $r_{24}$ | −336.344 | Bf | 13.45 | | | | | | |

| Focal length | $F_W = 10.5$ | $F_M = 33.0$ | $F_T = 105.0$ |
|---|---|---|---|
| $d_5$ | 0.96 | 30.80 | 46.55 |
| $d_{10}$ | 50.07 | 15.74 | 4.48 |
| $d_{12}$ | 5.12 | 9.61 | 5.12 |

$f_1 = 80.5$ $f_2 = -16.5$ $f_3 = -44.6$ $f_4 = 23.4$ $f_5 = 51.7$

Principal plane spacing between the fourth group and fifth group $D = 39.65$.

$\begin{pmatrix} r_{16} \text{ corresponds to } R_A \\ r_{21} \text{ corresponds to } R_B \end{pmatrix}$ As shown in the foregoing embodiments, the magnification changing systems of the respective embodiments are all of the same type of construction and with respect also to the master lens, various specifications from 6-times zoom to 10-times zoom have been achieved by substantially the same type of construction with the exception of the difference that the fifth group comprises two components or one component.

FIGS. 5, 6, 7 and 8 illustrate the aberrations in the embodiments of FIGS. 1, 2, 3 and 4, respectively. In these aberration graphs, FIGS. 5A–8A, 5B–8B and 5C–8C respectively illustrate the aberrations in the wide angle end focal length condition $F_W$, the intermediate focal length condition $F_M$ and the telephoto end focal length condition $F_T$, and further, (a) shows the spherical aberration for the d-line ($\lambda = 587.6$ nm) and the g-line ($\lambda = 435.8$ nm), (b) shows the astigmatism for the d-line, (c) shows the distortion for the d-line, (d) shows the coma for the d-line and the g-line of a maximum angle of view, and (e) shows the axial aberration for the d-line of a maximum angle of view, of an intermediate angle of view and on the axis.

From these aberration graphs, it is seen that various aberrations are corrected sufficiently well in all of the embodiments.

According to the present invention, as has hitherto been described, there can be realized a zoom lens in which the relay lens system is of a simple compact construction comprising three components for the forward group and two or one component for the rearward group, as previously described, and yet the increase in various aberrations attributable to the compactness of the magnification changing system can be sufficiently corrected. The zoom lens of the invention cannot only be a bright lens, with the brightness of F-number 1.6 equivalent to that of prior art zoom lenses, but can also be a very bright lens, as bright as F-number 1.2. Moreover, the invention provides an excellent zoom lens which has a relatively high zoom ratio and which is compact and which has been made into a telecentric system to thereby prevent color registration and minimize the occurrence of ghost.

We claim:

1. A zoom lens which is compact and light in weight, which has a large aperture ratio of about 1:1.2 to 1:1.6, and which has a high zoom ratio of about 6 to 10, comprising, a magnification changing system including, in succession from the object side, a first lens means as a focusing portion having a positive refractive power, a second lens means as a variator portion having a negative refractive power and movable along the optical axis to thereby change chiefly the focal length, and a third lens means as a compensator portion having a negative refractive power and maintaining the image plane fluctuated by movement of said variator portion at a predetermined position, and a relay lens system succeeding said magnification changing system,
consisting essentially of a fourth lens means as a forward relay group having a positive refractive power and a fifth lens means as a rearward relay group having a positive refractive power,
said fourth lens means consisting of, in succession from the object side, a positive lens component having its surface of sharper curvature facing the image side, a biconvex cemented positive lens component having a cemented surface convex to the image side and a positive lens component having its surface of sharper curvature facing the object side, said fifth lens means consisting of a cemented positive lens component having a cemented surface convex to the object side and a positive lens component,
wherein said zoom lens satisfies the following conditions:

$$1.7 < \frac{|R_A|}{F_W} < 2.4 \tag{1}$$

$$0.5 < \frac{R_B}{F_W} < 2.0 \tag{2}$$

$$60 > \nu_{AP} - \nu_{AN} > 30 \tag{3}$$

$$60 > \nu_{BP} - \nu_{BN} > 20 \tag{4}$$

$$0.7 < \frac{D}{f_5} < 1.5 \tag{5}$$

$$1.0 < \frac{Rc}{Bf} < 5.0 \tag{6}$$

where $R_A$ represents the radius of curvature of the cemented surface of the cemented lens component in said fourth lens means, $\nu_{AP}$ and $\nu_{AN}$ represent the Abbe numbers of a positive lens and a negative lens, respectively, forming said cemented lens component in said fourth lens means, $R_B$ represents the radius of curvature of the cemented surface of the cemented lens component in said fifth lens means, $\nu_{BP}$ and $\nu_{BN}$ represent the Abbe numbers of a positive lens and a negative lens, respectively, forming said cemented lens component in said fifth lens means, $F_W$ represents the focal length of the entire system at the wide angle end, $f_5$ represents the focal length of said fifth lens means, D represents the principal plane spacing between said fourth lens means and said fifth lens means, Rc represents the radius of curvature of the object side surface of the positive lens component in said fifth lens means, and Bf represents the back focal length.

2. A zoom lens according to claim 1, wherein said first lens means has a cemented positive lens component having a cemented surface convex to the object side and a positive meniscus lens component having its convex surface facing the object side, said second lens means has a negative meniscus lens component having its convex surface facing the object side, and a cemented negative lens component having a cemented surface convex to the object side, said third lens means has a negative lens component having its surface of sharper curvature facing the object side.

3. The zoom lens recited in claim 2, wherein said zoom lens further satisfies the following conditions:

$$0.5 < \frac{f_1}{F_T} < 1.5 \tag{7}$$

$$-5.0 < \frac{f_1}{f_2} < -3.7 \tag{8}$$

$$2.5 < \frac{f_3}{f_2} < 3.0 \tag{9}$$

$$-3.0 < \frac{r_a + r_b}{r_a - r_b} < -1.5 \tag{10}$$

where $f_1$, $f_2$, $f_3$, $f_4$ and $f_5$ represent the focal lengths of said first, second, third, fourth and fifth lens means, respectively, $F_T$ represents the focal length of the entire system at the telephoto end, and $r_a$ and $r_b$ represent the radii of curvature of the forward and rearward surfaces, respectively, of the positive meniscus lens component in said first lens means.

4. The zoom lens recited in claim 3, wherein said zoom lens further satisfies the following conditions:

$$5.0 F_W < f_1 < 8.0 F_W \tag{11}$$

$$1.0 F_W < |f_2| < 2.0 F_W \tag{12}$$

$$3.0 F_W < |f_3| < 5.0 F_W \tag{13}$$

$$1.5 F_W < f_4 < 2.5 F_W \tag{14}$$

$$2.5 F_W < f_5 < 5.5 F_W \tag{15}$$

where $F_W$ represents the focal length of the entire system at the wide angle end.

5. The zoom lens recited in claim 4, wherein numerical data are as follows:

| Focal length 11.5~69.0, Zoom ratio 6, F-number 1.2 | | | | | | | | |
|---|---|---|---|---|---|---|---|---|
| Radius of curvature | | Center thickness and air space | | Refractive index | | Abbe number | | |
| $r_1$ | 82.283 | $d_1$ | 1.3 | $n_1$ | 1.80518 | $\nu_1$ | 25.5 | $L_1$ |
| $r_2$ | 41.208 | $d_2$ | 11.7 | $n_2$ | 1.71300 | $\nu_2$ | 53.9 | |
| $r_3$ | −395.394 | $d_3$ | 0.1 | | | | | $G_1$ |
| $r_4$ | 42.755 | $d_4$ | 5.7 | $n_3$ | 1.51680 | $\nu_3$ | 64.2 | $L_2$ |
| $r_5$ | 92.175 | $d_5$ | Variable | | | | | |
| $r_6$ | 122.416 | $d_6$ | 1.0 | $n_4$ | 1.74443 | $\nu_4$ | 49.4 | $L_3$ |
| $r_7$ | 15.859 | $d_7$ | 6.5 | | | | | |
| $r_8$ | −20.060 | $d_8$ | 1.0 | $n_5$ | 1.60311 | $\nu_5$ | 60.7 | $L_4$ $G_2$ |
| $r_9$ | 22.337 | $d_9$ | 3.5 | $n_6$ | 1.80518 | $\nu_6$ | 25.5 | |
| $r_{10}$ | −6704.737 | $d_{10}$ | Variable | | | | | |
| $r_{11}$ | −21.619 | $d_{11}$ | 1.0 | $n_7$ | 1.60311 | $\nu_7$ | 60.7 | $L_5$ } $G_3$ |

-continued

| | | | | Focal length 11.5~69.0, Zoom ratio 6, F-number 1.2 | | | | | |
|---|---|---|---|---|---|---|---|---|---|
| $r_{12}$ | −189.609 | $d_{12}$ | Variable | | | | | | |
| $r_{13}$ | −42.947 | $d_{13}$ | 3.9 | $n_8$ | 1.71300 | $\nu_8$ | 53.9 | $L_6$ | |
| $r_{14}$ | −22.593 | $d_{14}$ | 0.1 | | | | | | |
| $r_{15}$ | 158.920 | $d_{15}$ | 9.0 | $n_9$ | 1.56384 | $\nu_9$ | 60.8 | $L_7$ | $G_4$ |
| $r_{16}$ | −21.084 | $d_{16}$ | 1.0 | $n_{10}$ | 1.74000 | $\nu_{10}$ | 28.2 | | |
| $r_{17}$ | −46.347 | $d_{17}$ | 0.2 | | | | | | |
| $r_{18}$ | 44.489 | $d_{18}$ | 3.8 | $n_{11}$ | 1.74000 | $\nu_{11}$ | 44.9 | $L_8$ | |
| $r_{19}$ | 362.562 | $d_{19}$ | 1.8 | | | | | | |
| $r_{20}$ | ∞ | $d_{20}$ | 10.0 | $n_{12}$ | 1.57501 | $\nu_{12}$ | 41.3 | Prism P | |
| $r_{21}$ | ∞ | $d_{21}$ | 25.1 | | | | | | |
| $r_{22}$ | 144.303 | $d_{22}$ | 1.0 | $n_{13}$ | 1.74000 | $\nu_{13}$ | 28.2 | $L_9$ | |
| $r_{23}$ | 17.591 | $d_{23}$ | 6.0 | $n_{14}$ | 1.56384 | $\nu_{14}$ | 60.8 | | $G_5$ |
| $r_{24}$ | −52.016 | $d_{24}$ | 0.2 | | | | | | |
| $r_{25}$ | 19.770 | $d_{25}$ | 4.0 | $n_{15}$ | 1.51680 | $\nu_{15}$ | 64.2 | $L_{10}$ | |
| $r_{26}$ | 136.874 | Bf | 16.54 | | | | | | |

| Focal length | $F_W = 11.5$ | $F_M = 28.0$ | $F_T = 69.0$ |
|---|---|---|---|
| $d_5$ | 1.96 | 20.04 | 31.05 |
| $d_{10}$ | 32.71 | 12.06 | 4.00 |
| $d_{12}$ | 3.42 | 6.99 | 3.05 |

$f_1 = 63.3$ $f_2 = -15.0$ $f_3 = -40.5$ $f_4 = 24.8$ $f_5 = 34.3$

Principal plane spacing between the fourth and the fifth lens means D = 42.36

$\begin{pmatrix} r_{16} \text{ corresponds to } R_A \\ r_{23} \text{ corresponds to } R_B \end{pmatrix}$ 6. The zoom lens recited in claim 4, wherein numerical data are as follows:

| | | Focal length 11.0~88.0, Zoom ratio 8, F-number 1.6 | | | | | | | |
|---|---|---|---|---|---|---|---|---|---|
| | Radius of curvature | Center thickness and air space | | Refractive index | | Abbe number | | | |
| $r_1$ | 87.625 | $d_1$ | 1.3 | $n_1$ | 1.80518 | $\nu_1$ | 25.5 | $L_1$ | |
| $r_2$ | 47.000 | $d_2$ | 10.3 | $n_2$ | 1.65160 | $\nu_2$ | 58.5 | | $G_1$ |
| $r_3$ | −401.700 | $d_3$ | 0.1 | | | | | | |
| $r_4$ | 49.638 | $d_4$ | 5.4 | $n_3$ | 1.51660 | $\nu_3$ | 64.2 | $L_2$ | |
| $r_5$ | 129.555 | $d_5$ | variable | | | | | | |
| $r_6$ | 89.890 | $d_6$ | 1.0 | $n_4$ | 1.71300 | $\nu_4$ | 53.9 | $L_3$ | |
| $r_7$ | 15.414 | $d_7$ | 5.8 | | | | | | $G_2$ |
| $r_8$ | −20.393 | $d_8$ | 1.0 | $n_5$ | 1.58913 | $\nu_5$ | 61.2 | $L_4$ | |
| $r_9$ | 18.054 | $d_9$ | 3.9 | $n_6$ | 1.71736 | $\nu_6$ | 29.5 | | |
| $r_{10}$ | −299.105 | $d_{10}$ | variable | | | | | | |
| $r_{11}$ | −23.883 | $d_{11}$ | 1.0 | $n_7$ | 1.60311 | $\nu_7$ | 60.7 | $L_5$ | $G_3$ |
| $r_{12}$ | −237.505 | $d_{12}$ | variable | | | | | | |
| $r_{13}$ | −153.412 | $d_{13}$ | 3.2 | $n_8$ | 1.71300 | $\nu_8$ | 53.9 | $L_6$ | |
| $r_{14}$ | −29.058 | $d_{14}$ | 0.1 | | | | | | |
| $r_{15}$ | 56.397 | $d_{15}$ | 6.5 | $n_9$ | 1.58913 | $\nu_9$ | 61.2 | $L_7$ | $G_4$ |
| $r_{16}$ | −22.050 | $d_{16}$ | 1.0 | $n_{10}$ | 1.75520 | $\nu_{10}$ | 27.5 | | |
| $r_{17}$ | −68.139 | $d_{17}$ | 0.1 | | | | | | |
| $r_{18}$ | 37.710 | $d_{18}$ | 2.5 | $n_{11}$ | 1.71300 | $\nu_{11}$ | 53.9 | $L_8$ | |
| $r_{19}$ | 114.270 | $d_{19}$ | 21.9 | | | | | | |
| $r_{20}$ | 83.072 | $d_{20}$ | 1.0 | $n_{12}$ | 1.74950 | $\nu_{12}$ | 25.0 | $L_9$ | |
| $r_{21}$ | 11.546 | $d_{21}$ | 4.3 | $n_{13}$ | 1.56823 | $\nu_{13}$ | 56.0 | | $G_5$ |
| $r_{22}$ | −98.731 | $d_{22}$ | 1.0 | | | | | | |
| $r_{23}$ | 50.000 | $d_{23}$ | 2.0 | $n_{14}$ | 1.74400 | $\nu_{14}$ | 44.9 | $L_{10}$ | |
| $r_{24}$ | −130.371 | Bf | 14.95 | | | | | | |

| Focal length | $F_W = 11.0$ | $F_M = 31.0$ | $F_T = 88.0$ |
|---|---|---|---|
| $d_5$ | 0.89 | 26.77 | 40.85 |
| $d_{10}$ | 41.97 | 13.27 | 3.26 |
| $d_{12}$ | 4.53 | 8.35 | 4.27 |

$f_1 = 72.1$ $f_2 = -16.4$ $f_3 = -44.3$ $f_4 = 22.2$ $f_5 = 49.7$

Principal plane spacing between the fourth and the fifth lens means $D = 51.19$ $\begin{pmatrix} r_{16} \text{ corresponds to } R_A \\ r_{21} \text{ corresponds to } R_B \end{pmatrix}$ 7. The zoom lens recited in claim 4, wherein numerical data are as follows:

| Focal length 10.5~105.0, Zoom ratio 10, F-number 1.6 | | | | | | | | | |
|---|---|---|---|---|---|---|---|---|---|
| Radius of curvature | | Center thickness and air space | | Refractive index | | Abbe number | | | |
| $r_1$ | 97.177 | $d_1$ | 1.3 | $n_1$ | 1.80518 | $\nu_1$ | 25.5 | $L_1$ | |
| $r_2$ | 53.212 | $d_2$ | 12.5 | $n_2$ | 1.65160 | $\nu_2$ | 58.5 | | $G_1$ |
| $r_3$ | −799.589 | $d_3$ | 0.1 | | | | | | |
| $r_4$ | 55.667 | $d_4$ | 7.0 | $n_3$ | 1.51860 | $\nu_3$ | 70.1 | $L_2$ | |
| $r_5$ | 172.998 | $d_5$ | variable | | | | | | |
| $r_6$ | 167.781 | $d_6$ | 1.0 | $n_4$ | 1.65160 | $\nu_4$ | 58.5 | $L_3$ | |
| $r_7$ | 16.132 | $d_7$ | 6.1 | | | | | | $G_2$ |
| $r_8$ | −23.692 | $d_8$ | 1.0 | $n_5$ | 1.58913 | $\nu_5$ | 61.2 | $L_4$ | |
| $r_9$ | 18.905 | $d_9$ | 4.0 | $n_6$ | 1.72825 | $\nu_6$ | 28.3 | | |
| $r_{10}$ | 330.951 | $d_{10}$ | variable | | | | | | |
| $r_{11}$ | −24.955 | $d_{11}$ | 1.0 | $n_7$ | 1.60311 | $\nu_7$ | 60.7 | $L_5$ | $G_3$ |
| $r_{12}$ | −349.908 | $d_{12}$ | variable | | | | | | |
| $r_{13}$ | −211.000 | $d_{13}$ | 3.4 | $n_8$ | 1.74443 | $\nu_8$ | 49.4 | $L_6$ | |
| $r_{14}$ | −30.530 | $d_{14}$ | 0.1 | | | | | | |
| $r_{15}$ | 66.041 | $d_{15}$ | 6.8 | $n_9$ | 1.58913 | $\nu_9$ | 61.2 | $L_7$ | $G_4$ |
| $r_{16}$ | −24.732 | $d_{16}$ | 1.1 | $n_{10}$ | 1.78470 | $\nu_{10}$ | 26.1 | | |
| $r_{17}$ | −83.595 | $d_{17}$ | 0.1 | | | | | | |
| $r_{18}$ | 40.841 | $d_{18}$ | 2.6 | $n_{11}$ | 1.71300 | $\nu_{11}$ | 53.9 | $L_8$ | |
| $r_{19}$ | 167.230 | $d_{19}$ | 30.0 | | | | | | |
| $r_{20}$ | 48.248 | $d_{20}$ | 1.0 | $n_{12}$ | 1.74950 | $\nu_{12}$ | 35.0 | $L_9$ | |
| $r_{21}$ | 10.845 | $d_{21}$ | 5.0 | $n_{13}$ | 1.56883 | $\nu_{13}$ | 56.0 | | $G_5$ |
| $r_{22}$ | −115.462 | $d_{22}$ | 1.0 | | | | | | |
| $r_{23}$ | 60.000 | $d_{23}$ | 2.1 | $n_{14}$ | 1.79631 | $\nu_{14}$ | 40.8 | $L_{10}$ | |
| $r_{24}$ | −336.344 | $Bf$ | 13.45 | | | | | | |
| Focal length | | $F_W = 10.5$ | | $F_M = 33.0$ | | $F_T = 105.0$ | | | |
| $d_5$ | | 0.96 | | 30.80 | | 46.55 | | | |
| $d_{10}$ | | 50.07 | | 15.74 | | 4.48 | | | |
| $d_{12}$ | | 5.12 | | 9.61 | | 5.12 | | | |

$f_1 = 80.5$ $f_2 = -16.5$ $f_3 = -44.6$ $f_4 = 23.4$ $f_5 = 51.7$

Principal plane spacing between the fourth and fifth lens means $D = 39.65$ $\begin{pmatrix} r_{16} \text{ corresponds to } R_A \\ r_{21} \text{ corresponds to } R_B \end{pmatrix}$ 8. A zoom lens which is compact and light in weight, which has a large aperture ratio of about 1:1.6, and which has a high zoom ratio of about 8 comprising, a magnification changing system including, in succession from the object side, a first lens means as a focusing portion having a positive refractive power, a second lens means as a variator portion having a negative refractive power and movable along the optical axis to thereby change chiefly the focal length, and a third lens means as a compensator portion having a negative refractive power and maintaining the image plane fluctuated by movement of said variator portion at a predetermined position, and a relay lens system succeeding said magnification changing system, consisting essentially of a fourth lens means as a forward relay group having a positive refractive power and a fifth lens means as a rearward relay group having a positive refractive power, said fourth lens means consisting of, in succession from the object side, a positive lens component having its surface of sharper curvature facing the image side, a biconvex cemented positive lens component having a cemented surface convex to the image side and a positive lens component having its surface of sharper curvature facing the object side, said fifth lens means consisting of a cemented positive lens component having a cemented surface convex to the object side, wherein said zoom lens satisfies the following conditions:

$$1.7 < \frac{|R_A|}{F_W} < 2.4 \tag{1}$$

$$0.5 < \frac{R_B}{F_W} < 2.0 \tag{2}$$

$$60 > \nu_{AP} - \nu_{AN} > 30 \tag{3}$$

$$60 > \nu_{BP} - \nu_{BN} > 20 \tag{4}$$

-continued $$0.7 < \frac{D}{f_5} < 1.5 \quad (5)$$

$$1.0 < \frac{Rc}{Bf} < 5.0 \quad (6)$$

where $R_A$ represents the radius of curvature of the cemented surface of the cemented lens component in said fourth lens means, $\nu_{AP}$ and $\nu_{AN}$ represent the Abbe numbers of a positive lens and a negative lens, respectively, forming said cemented lens component in said fourth lens means, $R_B$ represents the radius of curvature of the cemented surface of the cemented lens component in said fifth lens means, $\nu_{BP}$ and $\nu_{BN}$ represent the Abbe numbers of a positive lens and a negative lens, respectively, forming said cemented lens component in said fifth lens means, $F_W$ represents the focal length of the entire system at the wide angle end, $f_5$ represents the focal length of said fifth lens means, D represents the principal plane spacing between said fourth lens means and said fifth lens means, Rc represents the radius of curvature of the object side surface of the positive lens component in said fifth lens means, and Bf represents the back focal length.

9. A zoom lens according to claim 8, wherein said first lens means has a cemented positive lens component having a cemented surface convex to the object side and a positive meniscus lens component having its convex surface facing the object side, said second lens means has a negative meniscus lens component having its convex surface facing the object side, and a cemented negative lens component having a cemented surface convex to the object side, said third lens means has a negative lens component having its surface of sharper curvature facing the object side.

10. The zoom lens recited in claim 9, wherein numerical data are as follows:

| | Focal length 11.0~88.0, Zoom ratio 8, F-number 1.6 | | | | | | | | |
|---|---|---|---|---|---|---|---|---|---|
| | Radius of curvature | | Center thickness and air space | | Refractive index | | Abbe number | | |
| $r_1$ | 87.620 | $d_1$ | 1.3 | $n_1$ | 1.80518 | $\nu_1$ | 25.5 | $\}$ $L_1$ | |
| $r_2$ | 47.000 | $d_2$ | 10.3 | $n_2$ | 1.65160 | $\nu_2$ | 58.5 | | $\}$ $G_1$ |
| $r_3$ | −401.700 | $d_3$ | 0.1 | | | | | | |
| $r_4$ | 49.640 | $d_4$ | 5.4 | $n_3$ | 1.5168 | $\nu_3$ | 64.2 | $L_2$ | |
| $r_5$ | 129.551 | $d_5$ | variable | | | | | | |
| $r_6$ | 89.890 | $d_6$ | 1.0 | $n_4$ | 1.71300 | $\nu_4$ | 53.9 | $L_3$ | |
| $r_7$ | 15.410 | $d_7$ | 5.8 | | | | | | $\}$ $G_2$ |
| $r_8$ | −20.400 | $d_8$ | 1.0 | $n_5$ | 1.58913 | $\nu_5$ | 61.2 | $\}$ $L_4$ | |
| $r_9$ | 18.050 | $d_9$ | 3.9 | $n_6$ | 1.71736 | $\nu_6$ | 29.5 | | |
| $r_{10}$ | −298.366 | $d_{10}$ | variable | | | | | | |
| $r_{11}$ | −23.880 | $d_{11}$ | 1.0 | $n_7$ | 1.60311 | $\nu_7$ | 60.7 | $L_5$ | $\}$ $G_3$ |
| $r_{12}$ | −227.227 | $d_{12}$ | variable | | | | | | |
| $r_{13}$ | −158.642 | $d_{13}$ | 3.2 | $n_8$ | 1.71300 | $\nu_8$ | 53.9 | $L_6$ | |
| $r_{14}$ | −29.277 | $d_{14}$ | 0.1 | | | | | | |
| $r_{15}$ | 61.016 | $d_{15}$ | 5.9 | $n_9$ | 1.58913 | $\nu_9$ | 61.2 | $\}$ $L_7$ | |
| $r_{16}$ | −22.400 | $d_{16}$ | 1.0 | $n_{10}$ | 1.80518 | $\nu_{10}$ | 25.5 | | $G_4$ |
| $r_{17}$ | −50.736 | $d_{17}$ | 0.3 | | | | | | |
| $r_{18}$ | ∞ | $d_{18}$ | 10.0 | $n_{11}$ | 1.57501 | $\nu_{11}$ | 41.3 | Prism P | |
| $r_{19}$ | ∞ | $d_{19}$ | 4.0 | | | | | | |
| $r_{20}$ | 40.658 | $d_{20}$ | 2.5 | $n_{12}$ | 1.74443 | $\nu_{12}$ | 49.4 | $L_8$ | |
| $r_{21}$ | 103.601 | $d_{21}$ | 29.7 | | | | | | |
| $r_{22}$ | 16.288 | $d_{22}$ | 1.0 | $n_{13}$ | 1.75520 | $\nu_{13}$ | 27.5 | $\}$ $L_9$ | $\}$ $G_5$ |
| $r_{23}$ | 8.967 | $d_{23}$ | 6.0 | $n_{14}$ | 1.56883 | $\nu_{14}$ | 56.0 | | |
| $r_{24}$ | −1564.799 | Bf | 11.43 | | | | | | |
| Focal length | | $F_W = 11.0$ | | $F_M = 31.0$ | | $F_T = 88.0$ | | | |
| $d_5$ | | 0.89 | | 25.76 | | 39.85 | | | |
| $d_{10}$ | | 41.97 | | 13.27 | | 3.26 | | | |
| $d_{12}$ | | 2.11 | | 5.93 | | 1.86 | | | |

$f_1 = 72.1$ $f_2 = -16.4$ $f_3 = -44.3$ $f_4 = 21.5$ $f_5 = 37.8$

Principal plane spacing between the fourth and the fifth lens means D = 34.02

$$\begin{pmatrix} r_{16} \text{ corresponds to } R_A \\ r_{23} \text{ corresponds to } R_B \end{pmatrix}$$

* * * * *